O. BANKS.
MECHANICAL MOVEMENT.
APPLICATION FILED JAN. 23, 1911.

1,009,127.

Patented Nov. 21, 1911.

Witnesses
F. C. Barry

Inventor
Owen Banks
By
Attorneys

UNITED STATES PATENT OFFICE.

OWEN BANKS, OF PLYMOUTH, INDIANA.

MECHANICAL MOVEMENT.

1,009,127.

Specification of Letters Patent. Patented Nov. 21, 1911.

Application filed January 23, 1911. Serial No. 604,262.

*To all whom it may concern:*

Be it known that I, OWEN BANKS, a citizen of the United States, residing at Plymouth, in the county of Marshall and State of Indiana, have invented certain new and useful Improvements in Mechanical Movements, of which the following is a specification.

The present invention has for its object to provide a novel device for increasing the power of an internal-combustion or steam engine, and to this end it consists in a construction and arrangement of parts to be hereinafter described and claimed, reference being had to the accompanying drawing forming a part of this specification, in which drawing—

Figure 1:
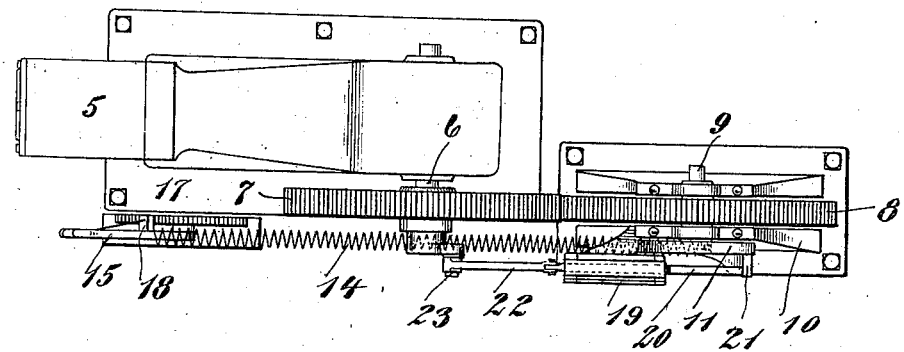
Figure 2:
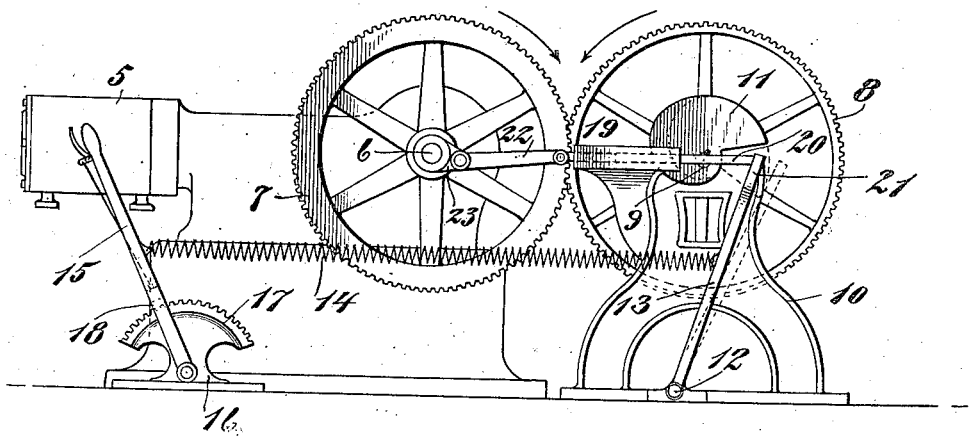

Figure 1 is a plan view showing the application of the invention, and Fig. 2 is an elevation thereof.

Referring specifically to the drawing, 5 denotes an engine which may be an internal-combustion or steam engine, the structure of which is immaterial to the present invention, in view of which a detailed description thereof is deemed unnecessary. On the crank shaft 6 of the engine is fixed a spur gear 7 which is in mesh with a similar gear 8 fixed to a countershaft 9 which is supported in suitable bearings on a stand 10. These two gears have the same diameter so they will rotate at the same speed.

On the shaft 9 is made fast a cam or wiper 11, and to the base of the stand 10 is pivoted at 12 a lever 13, the free end of which extends into the path of the cam, so that it may be engaged thereby. To the lever is fastened one end of a coiled spring 14, the other end of which is made fast to a hand lever 15 pivoted to a stand 16 having a toothed sector 17 which is engageable by a spring latch or other suitable locking device 18 carried by the hand lever, whereby the latter is locked. The hand lever serves as a support for fastening one end of the spring 14, and it may also be employed for adjusting the tension of said spring.

On the stand 10 is a horizontal slideway 19 in which is mounted a stem 20, one end of which stem is in the path of a projection 21 on the lever 13, so as to be engaged thereby, and to the other end of the lever is pivotally connected a pitman 22 which is connected to a crank 23 on the shaft 6.

In operation, when the engine is running, the cam 11 is rotated through the gears 7 and 8, and as said cam engages the lever 13 it swings the latter in one direction against the tension of the spring 14, the latter being expanded. When the lever slips off the widest portion of the cam, it is swung in the opposite direction by the contraction of the spring, and upon striking the stem 20, it pushes the same forwardly, whereupon, by reason of the connection between said stem and the crank 23, an additional rotative impulse is imparted to the shaft 6. The cam then again swings the lever in a direction to expand the spring, and the herein described cycle of operation is repeated.

I claim:

1. The combination with an engine shaft, of a countershaft, a gearing between said shafts, a cam on the countershaft, a lever in the path of the cam, a spring connected to the lever, a sliding stem having one of its ends extending into the path of the lever, a crank on the engine shaft, and a pitman connection between said crank and the stem.

2. The combination with an engine shaft, of a countershaft, a gearing between said shafts, a cam on the countershaft, a lever having its free end in the path of the cam, a spring connected at one of its ends to the lever, an adjustable hand lever to which the other end of the spring is connected, a sliding stem extending at one of its ends into the path of the free end of the first-mentioned lever, a crank on the engine shaft, and a pitman connection between said crank and the other end of the stem.

In testimony whereof I affix my signature in presence of two witnesses.

OWEN BANKS.

Witnesses:
WILLIAM H. MARTIN,
CLINTON A. BONDURANT.